United States Patent
Kongtcheu

(10) Patent No.: US 8,078,558 B2
(45) Date of Patent: Dec. 13, 2011

(54) METHOD FOR OPTIMIZING INEQUALITY AND EQUALITY CONSTRAINED RESOURCES ALLOCATION PROBLEMS IN INDUSTRIAL APPLICATIONS

(76) Inventor: Phil Kongtcheu, Jersey City, NJ (US)

( * ) Notice: Subject to any disclaimer, the term of this patent is extended or adjusted under 35 U.S.C. 154(b) by 848 days.

(21) Appl. No.: 12/127,760

(22) Filed: May 27, 2008

(65) Prior Publication Data

US 2009/0299928 A1    Dec. 3, 2009

(51) Int. Cl.
*G06F 17/00* (2006.01)
(52) U.S. Cl. .................................................... 706/45
(58) Field of Classification Search .............. 706/12, 706/45–48
See application file for complete search history.

(56) References Cited

U.S. PATENT DOCUMENTS

2005/0209898 A1    9/2005    Asai et al.

OTHER PUBLICATIONS

Derenick et al., Second-order Cone Programming (SOCP) Techniques for Coordinating Large-scale Robot Teams in Polygonal Environments, SPringer 2007, pp. 1-14.*
Pavan et al., Dominant Sets and Pairwise Clustering, 2007, IEEE Transactions on pattern analysis and machine intelligence, vol. 29. No. 1, pp. 167-172.*
Tosserams et al., An augmentedLagrangian decomposition method for quasi-separable problems in MDO, 2006.*

* cited by examiner

*Primary Examiner* — David Vincent

(57) ABSTRACT

In industrial applications, the invention relates to various algorithms for determining optimal resources or assets allocations under various equality and inequality constraints. In particular, constrained quadratic or conic optimization problems of unique importance for portfolio asset allocation are seamlessly solved in analytic and efficient ways. In addition, by providing exact or analytic optimum expressions, robustness can be readily ascertained.

9 Claims, 7 Drawing Sheets

---

After deriving the KKT equations and inequalities,

- Pre-selection of points where the inequality boundaries are reached starting from the least number of boundary constraints reached

↓

- Block Decomposition of tensor parameters where a first block identifies coordinates where an inequality constraint is reached and the remaining coordinates identify the remaining block and assigning the value zero to the corresponding slacking parameters

↓

- Resolution of the systems of equations by direct analytical inversions or substitutions methods or approximate algorithms to obtain $W_q$ the one or more vector of coordinates not having reached the inequalities boundaries and the associated slacking parameters $y_p$

Computation of KKT Candidate Local Extrema

Partially Ordered Indexation System
$\varepsilon$ is an indexation of the constraints that are active for a given candidate local extremum
For any given $\varepsilon$ and $\varepsilon'$, $\varepsilon << \varepsilon'$ Or $\varepsilon'$ is a descendent of $\varepsilon'$ Or $\varepsilon$ is a parent of $\varepsilon'$ if constraints indexed by $\varepsilon$ are also indexed by $\varepsilon'$.

Set E Indexing Maximal number of Local Extrema
E is a set indexing all cases that a priori need be evaluated, i.e. the maximum number of potential local extrema $E=\{E(0),E(1),...E(m)\}$;
E comprises subsets $E(j)$, with j indicating the number of constraints active in elements of the subset $E(j)$
$nj=\#E(j)$, the number of elements in $E(j); E(0)=\{\varepsilon 0\}$; $\varepsilon 0=(0,...,0)$ i.e. no constraint apply.

Set Ep Indexing Excluded Potential Extrema
Ep is a set indexing all cases that together with their descendents need not be evaluated and thus subtracted from Ep
$Ep=\{Ep(1),...Ep(m)\}$; $npj=\#Ep(j)$
Ep comprises subsets $Ep(j)$, with j indicating the number of constraints active in elements of the subset $Ep(j)$.

Sequence of Local Extrema Evaluation
For i=0 to m
For j=1 to nj
1) If $Wp(\varepsilon)(2)=1$, add $\varepsilon$ to $Ep(i)$ and compare $Wp(\varepsilon)(1)$ to previously stored candidate optima;
-If better, replace;
-If equal, add;
-If less, discard;
    2) If $Wp(\varepsilon)(2)=-1$, add $\varepsilon$ to $Ep(i)$;
    3) If $Wp(\varepsilon)(2)=0$ and i<m, add the direct descendents of $\varepsilon$ to $E(i+1)$ for subsequent evaluation.

Fig 1. Components and structure of Algorithm

After deriving the KKT equations and inequalities,

- Pre-selection of points where the inequality boundaries are reached starting from the least number of boundary constraints reached

- Block Decomposition of tensor parameters where a first block identifies coordinates where an inequality constraint is reached and the remaining coordinates identify the remaining block and assigning the value zero to the corresponding slacking parameters

- Resolution of the systems of equations by direct analytical inversions or substitutions methods or approximate algorithms to obtain $W_q$ the one or more vector of coordinates not having reached the inequalities boundaries and the associated slacking parameters $\gamma_p$ Fig 2. Computation of KKT Candidate Local Extrema

I - 1$^{st}$ Order Necessary Conditions (From KKT)

a) Verification of boundary conditions by KKT Point Candidate b) Verification of Slacking conditions by KKT Point Candidate
If either a) or b) is not verified Wp($\varepsilon$)(2)=0

II - 2$^{nd}$ Order Sufficient Conditions

Verification of semi-definite positive (resp. negative) Hessian for local minimum(resp. maximum) by KKT Point Candidate

- If condition II is not verified and it can be deduced it may not be verified for descendents, Wp($\varepsilon$)(2)=-1,

- else Wp($\varepsilon$)(2)=0

---

- If conditions I & II are verified, Wp($\varepsilon$)(2)=1

- If there is no candidate returned by Wp($\varepsilon$)(1) because specified constraints cannot be verified by any point, then Wp($\varepsilon$)(2)=-1

Fig 3. Admissibility Conditions

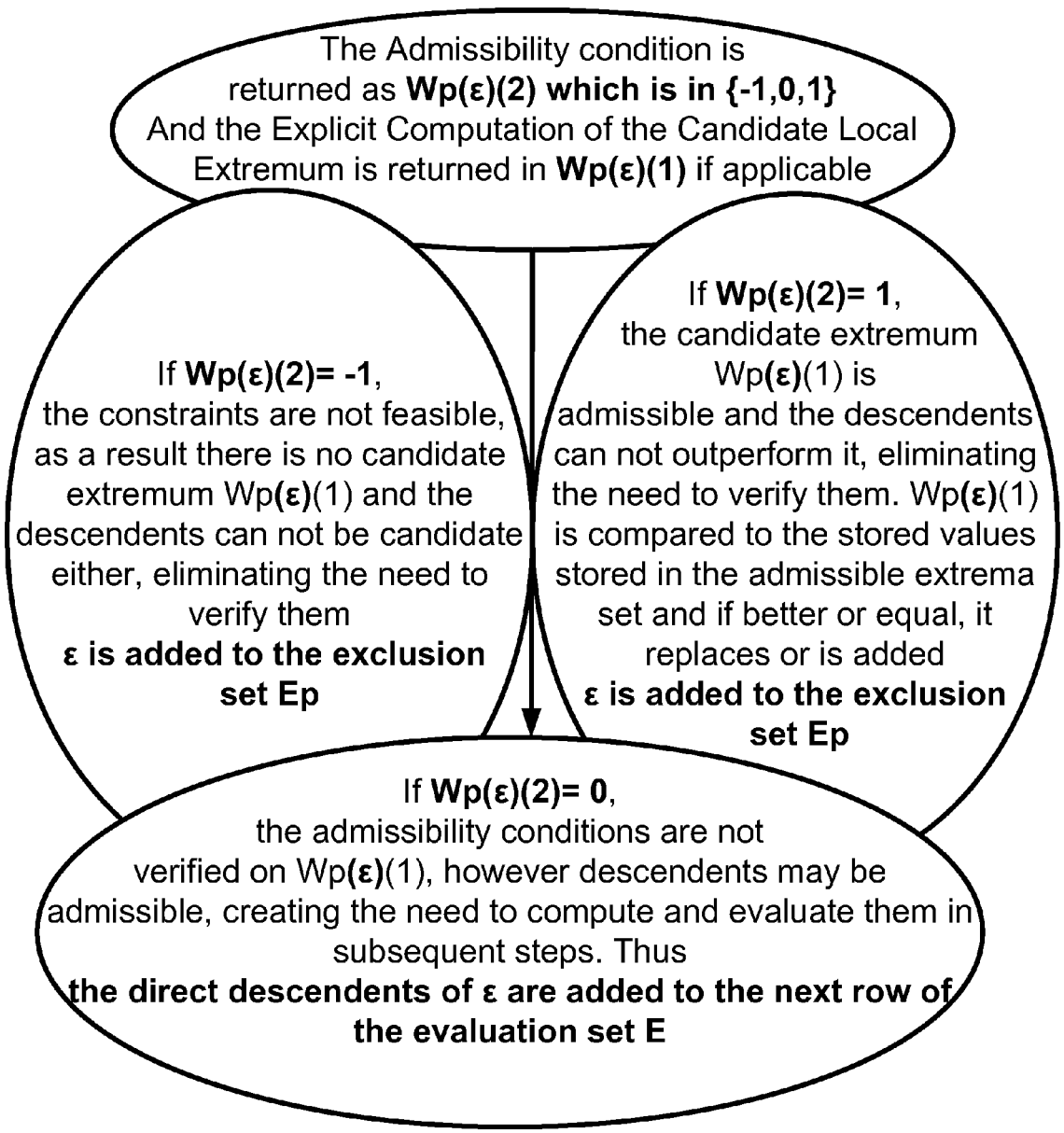
Fig 4. Treatment of function Wp

Within the framework of KKT derived points as described, computational reduction strategies include Before KKT equations and inequalities are solved:

- Dimension Reduction from permutations invariance or other similar dimension reducing transformations
- Change of variable to facilitate treatment of inequality constraints or to facilitate deducing if the Hessian is positive definite (for a minimum) or negative definite (for a maximum).

In addition:

- Use the Order Relationship << to Eliminate unnecessary cases from evaluation list

- Matrix Inverse Computational Reduction By exploitation of Relationships on the Order Relationship << dependency tree

- Grouping of Cases i.e. along same inverse matrix requirements or other parameters

Fig 5. Computational Reduction Strategies

Sample Benefits of Method

Computational Speed Gains

Parametric Sensitivity analysis - Robustness Analysis

Exact Resolution of related Derivative problems

Fig 6. Comparative Benefits of the Method

Sample problems facilitated by the method

Specific Examples
Optimization targets that are both functions of expectation and variance i.e.: Max/Min $f(\mu,\sigma)$
0-1 integer problems

General
1) More generally, Using numerical algorithms for the solution of systems of equations with multiple unknowns, derive KKT candidates, associated Hessians and the verifiability of admissibility conditions 2) Approximate resolution of all types of Optimization Problems using methods that rely on solutions to quadratic optimization problems, for example Sequential Quadratic Optimization methods Fig 7. Scope of the Method

METHOD FOR OPTIMIZING INEQUALITY AND EQUALITY CONSTRAINED RESOURCES ALLOCATION PROBLEMS IN INDUSTRIAL APPLICATIONS

BACKGROUND OF THE INVENTION

In industrial applications, a substantial number of problems of efficient allocations of resources can be translated into the mathematical resolution of one or more constrained optimization problems, that is problems in which one seeks to minimize or maximize a real function by systematically choosing the values of real or integer variables from within a constrained allowed set.

As a subset of optimization problems, quadratic or conic optimization problems comprise one of the most important areas of nonlinear programming. They are currently solved in practical applications preferentially using variations of so-called "interior point methods"[i] that are generally relevant for convex optimization problems. Numerous practical problems, including problems in financial portfolio optimization, portfolio hedging, planning and scheduling, economies of scale, and engineering design, and control are naturally expressed as quadratic optimization problems.

We describe a new and more effective method for solving optimization problems in general by actually explicitly solving the apparently intractable Karush-Kuhn Tucker (KKT) equations and inequalities associated with the mathematical formulation of the problems. The general method outlined in our drawings and below is illustrated in detail through the resolution of classical quadratic and conic optimization problems.

BRIEF DESCRIPTION OF THE SEVERAL VIEWS OF THE DRAWINGS

FIG. 1 illustrates the components and structure of the algorithm implementing our method.

FIG. 2 describes the procedure for obtaining candidate local extrema from KKT equations.

FIG. 3 outlines the conditions under which a local extremum may be admissible via the verification of first and second order inequality constraints.

FIG. 4 outline the disposition of potential candidate local extrema.

FIG. 5 describes various strategies that may be used to effect computational gains.

FIG. 6 summarizes obvious benefits of the method.

FIG. 7 expands on the scope of applications.

DETAILED DESCRIPTION

FIGS. 1 to 7 present the method in general. Our detailed description provides added clarity through the detailed study of two specific cases. These illustrations are made even more practical in the Mathematica computer implementation of Appendix 2.

Case 1: A Generic Quadratically Constrained Minimization Problem

This problem can be generally stated analytically as:
Find the solution to the constrained quadratic optimization problem $$\text{Min} \frac{1}{2} W^t \Sigma W + C^t W \text{ subject to constraints}$$

-continued $$\begin{cases} AW_t - B = 0; \\ \left| W - \frac{\overline{M} + \underline{M}}{2} \right| \leq \frac{\overline{M} - \underline{M}}{2} \end{cases}$$

with $M$, $W$, $C$, $\overline{M} \in ^m$, $\underline{M} \leq W \leq \overline{M}$, $A \in ^s \times ^m$;

Rank$(A) = s \leq m$, $B \in ^s$

Solution:
We proceed as outlined in FIG. 2. The KKT Equations are:

$$K = \frac{1}{2} W^t \Sigma W + C^t W + \lambda'^t (AW - B) - \gamma^- (W - \underline{M}) + \gamma^+ (W - \overline{M}) \lambda' \in ^s,$$

$$\underline{M} \leq W \leq \overline{M}, A \in ^s \times ^m;$$

the so-called
slacking parameters $\gamma^+, \gamma^-$ must verify $\gamma^+, \gamma^- \in _+^m$,
We note $\gamma \gamma^+ - \gamma^-$; We have:

$$\begin{cases} \nabla K^t = \Sigma W + C + A^t \lambda' + \gamma = 0 & (1) \\ AW - B = 0 & (2) \\ \gamma^+ (W - \overline{M}) = 0, \gamma^- (W - \underline{M}) = 0 & (3) \end{cases}$$

$$\nabla K^t = \Sigma W + C + A^t \lambda' + \gamma = 0 \quad (1)$$

We suppose there are p active constraints and q=m−p non-active ones. We perform a block decomposition along active and non active constraints. We introduce the operator LinSol defined in Appendix 1.

The non-active constraints lead to $\gamma^q = 0$. Hence, $$(1) \Leftrightarrow -\begin{pmatrix} s_{pp} & s_{pq} \\ s_{pq}^t & s_{qq} \end{pmatrix} \begin{pmatrix} M_p \\ W_q \end{pmatrix} = \begin{pmatrix} A_p^t \lambda' \\ A_q^t \lambda' \end{pmatrix} + \begin{pmatrix} C_p \\ C_q \end{pmatrix} + \begin{pmatrix} \gamma_p \\ 0 \end{pmatrix}$$

$$(1) \Leftrightarrow -\begin{pmatrix} s_{pp} & s_{pq} \\ s_{pq}^t & s_{qq} \end{pmatrix} \begin{pmatrix} M_p \\ W_q \end{pmatrix} = \begin{pmatrix} A_p^t \lambda' \\ A_q^t \lambda' \end{pmatrix} + \begin{pmatrix} C_p \\ C_q \end{pmatrix} + \begin{pmatrix} \gamma_p \\ 0 \end{pmatrix}$$

$$W_q = -LinSol(s_{qq}, s_{pq}^t M_p + A_q^t \lambda' + C_q);$$

$$\gamma_p = -s_{pp} M_p - A_p^t \lambda' - C_p + s_{pq} LinSol\begin{pmatrix} s_{qq}, s_{pq}^t M_p + \\ A_q^t \lambda' + C_q \end{pmatrix};$$

$$(2) \Leftrightarrow (A_p \ A_q) \begin{pmatrix} M_p \\ W_q \end{pmatrix} - B = 0$$

Note that $A_p$ is an s×p matrix and $A_q$ is an s×q matrix.

$$(2) \Leftrightarrow A_q W_q = B - A_p M_p;$$

$$(1) + (2) \Rightarrow -A_q LinSol(s_{qq}, s_{pq}^t M_p + A_q^t \lambda' + C_q) = B - A_p M_p$$

$$A_q LinSol(s_{qq}, A_q^t) \lambda' = A_p M_p - B - A_q LinSol(s_{qq}, s_{pq}^t M_p + C_q)$$

$$\lambda' = LinSol(A_q LinSol(s_{qq}, A_q^t), A_p M_p - B - A_q LinSol(s_{qq}, s_{pq}^t M_p + C_q))$$

We recall $$\boxed{\begin{aligned} W_q &= -LinSol(s_{qq}, s_{pq}^t M_p + A_q^t \lambda' + C_q); \\ \gamma_p &= -s_{pp} M_p - A_p^t \lambda' - C_p + s_{pq} LinSol(s_{qq}, s_{pq}^t M_p + A_q^t \lambda' + C_q); \end{aligned}}$$

This provides the general expression of the KKT local minima. In order for them to be admissible, they have to verify the admissibility conditions outlined in FIG. 3.

Appendix 2 shows how the algorithm implementing the structure outlined in FIG. 1 disposes of the local extrema as shown in FIG. 4. and implements the applicable strategies to effect computational gains as described in FIG. 5. The computer code in Appendix 2 is written in Mathematica, owned and copyrighted by Wolfram research. For clarity purposes, the matrix $\Sigma$ is assumed to be symmetric positive definite. This algorithm also counts the number of cases of local extrema actually computed to measure the effectiveness of the computational strategies used. It empirically appears that the number of local extrema actually computed, which a priory grows exponentially with m, becomes here reduce to polynomial of order approximating 3, supporting our claims of computational gains outline in FIG. 6.

Case 2: A Maximization Problem with Quadratically Constrained Equations and Inequalities This case illustrate that the constraints may be linear or quadratic. It is typically classified as a conic optimization problem. It may be used to solve a broad number of assets allocations problems in finance.

Problem

This problem can be generally stated analytically as finding the solution to the constrained quadratic optimization problem:

Max$W^t R$ subject to constraint s $$\begin{cases} AW - B = 0;\ W^t \Sigma W - \sigma^2 = 0 \\ \left| W - \frac{\overline{M} + \underline{M}}{2} \right| \leq \frac{\overline{M} - \underline{M}}{2} \end{cases}$$

with $\underline{M}, W, \overline{M}, R \in \Re^m$, $\underline{M} \leq W \leq \overline{M}$, $\sigma \in \Re^+$, $A \in \Re^{s \times m}$;

Rank$(A) = s \leq m$, $B \in \Re^s$

Solution:

The KKT Equations are:

$K = W^t R + \lambda'^t (AW - B) +$ $\quad \frac{\lambda}{2}(W^t \Sigma W - \sigma^2) - \gamma^- (W - \underline{M}) + \gamma^+ (W - \overline{M}) \lambda' \in \Re^s,$ $\lambda \in \Re, \underline{M} \leq W \leq \overline{M} \in \Re^m, A \in \Re^{s \times m}$;

Rank$(A) = s \leq m$, $B \in \Re^s$

The so-called slacking parameters $\gamma^+, \gamma^-$ must verify $\gamma^+, \gamma^- \in \Re_+^m$, We note $\gamma^+ - \gamma^-$; We have:

$$(I) \begin{cases} \nabla K = R^t + \lambda'^t A + \lambda W^t \Sigma + \gamma^t = 0 & (1) \\ AW - B = 0 & (2) \\ W^t \Sigma W - \sigma^2 = 0 & (3) \\ \gamma^+(W - \overline{M}) = 0,\ \gamma^-(W - \underline{M}) = 0 & (4) \end{cases}$$

(i) Let's first deal with constraints (I)

We suppose there are p active constraints, $0 \leq p \leq m$, $q = m - p$.

We note according to a block matrix decomposition $$\Sigma = \begin{pmatrix} s_{pp} & s_{pq} \\ s_{pq}^t & s_{qq} \end{pmatrix};$$

$$\varepsilon = \begin{pmatrix} \varepsilon_1 & & 0 \\ & \ddots & \\ 0 & & \varepsilon_{m_t} \end{pmatrix} = \begin{pmatrix} \varepsilon_{pp} & 0_{pq} \\ 0_{qp} & 0_{qq} \end{pmatrix};$$

$\varepsilon_i \in \{-1, 0, 1\}$, where $s_{pp}$, $s_{pq}$, $s_{qq}$, $\epsilon_{pp}$ are block matrices with the indices indicating the number of rows and columns respectively.

We also note $$\gamma = \begin{pmatrix} \gamma_p \\ 0 \end{pmatrix};\ R = \begin{pmatrix} R_p \\ R_q \end{pmatrix};$$

$$W = \begin{pmatrix} \frac{1}{2}(\overline{M}_p + \underline{M}_p) + \frac{\varepsilon_{pp}}{2}(\overline{M}_p + \underline{M}_p) & M_p \\ W_q & \end{pmatrix};$$

Expression of $W_q$, $\gamma_p$ $(\nabla K_t)^t = R + A^t \lambda' + \lambda \Sigma W + \gamma = 0$ \quad (1)

$-\lambda \Sigma W = R + A^t \lambda' + \gamma$ $-\lambda \begin{pmatrix} s_{pp} & s_{pq} \\ s_{pq}^t & s_{qq} \end{pmatrix} \begin{pmatrix} M_p \\ W_q \end{pmatrix} = \begin{pmatrix} R_p \\ R_q \end{pmatrix} + \begin{pmatrix} A_p^t \lambda' \\ A_q^t \lambda' \end{pmatrix} + \begin{pmatrix} \gamma_p \\ 0 \end{pmatrix}$ $$\begin{cases} \gamma_p = \lambda(s_{pq} s_{qq}^{-1} s_{pq}^t - s_{pp}) M_p + (s_{pq} s_{qq}^{-1}(R_q + A_q^t \lambda') - (R_p + A_p^t \lambda')) \\ W_q = -s_{qq}^{-1}\left(s_{pq}^t M_p + \frac{1}{\lambda}(R_q + A_q^t \lambda')\right) \end{cases}$$

Elimination of $\lambda'$ $(2) \Leftrightarrow A_q W_q = B - A_p M_p$

Note that $A_p$ is an s×p matrix and $A_q$ is an s×q matrix.

$(1) + (2) \Rightarrow -A_q s_{qq}^{-1}\left(s_{pq}^t M_p + \frac{1}{\lambda}(R_q + A_q^t \lambda')\right) = B - A_p M_p$ $(A_p - A_q s_{qq}^{-1} s_{pq}^t) M_p - B = \frac{1}{\lambda} A_q s_{qq}^{-1} R_q + \frac{1}{\lambda} A_q s_{qq}^{-1} A_q^t \lambda';\ \chi_s A_q s_{qq}^{-1} A_q^t;$ $\lambda' = \chi_s^{-1}(\lambda((A_p - A_q s_{qq}^{-1} s_{pq}^t) M_p - B) - A_q s_{qq}^{-1} R_q);$ $\frac{1}{\lambda}(R_q + A_q^t \lambda') = \frac{1}{\lambda}(R_q + A_q^t \chi_s^{-1}(\lambda((A_p - A_q s_{qq}^{-1} s_{pq}^t) M_p - B) - A_q s_{qq}^{-1} R_q));$ $\frac{1}{\lambda}(R_q + A_q^t \lambda') = A_q^t \chi_s^{-1}((A_p - A_q s_{qq}^{-1} s_{pq}^t) M_p - B) +$ $\qquad \frac{1}{\lambda}(I_q - A_q^t \chi_s^{-1} A_q s_{qq}^{-1}) R_q;$ $W_q = -s_{qq}^{-1}\Big(s_{pq}^t M_p + A_q^t \chi_s^{-1}((A_p - A_q s_{qq}^{-1} s_{pq}^t) M_p - B) +$ $\qquad \frac{1}{\lambda}(I_q - A_q^t \chi_s^{-1} A_q s_{qq}^{-1}) R_q\Big)$ $\gamma_p = \lambda(s_{pq} s_{qq}^{-1} s_{pq}^t - s_{pp}) M_p + (s_{pq} s_{qq}^{-1}(R_q + A_q^t \lambda') - (R_p + A_p^t \lambda'))$ $\gamma_p = \lambda((s_{pq} s_{qq}^{-1} s_{pq}^t - s_{pp} + (s_{pq} s_{qq}^{-1} A_q^t - A_p^t) \chi_s^{-1}(A_p - A_q s_{qq}^{-1} s_{pq}^t)) M_p -$ $\qquad (s_{pq} s_{qq}^{-1} A_q^t - A_p^t) \chi_s^{-1} B) +$ $\qquad (s_{pq} s_{qq}^{-1} R_q - R_p) - (s_{pq} s_{qq}^{-1} A_q^t - A_p^t) \chi_s^{-1} A_q s_{qq}^{-1} R_q$ Elimination of $\lambda$ $$W_q = \frac{1}{\lambda}a_q - b_q; W = \begin{pmatrix} M_p \\ W_q \end{pmatrix} = \frac{1}{\lambda}\begin{pmatrix} 0 \\ a_q \end{pmatrix} + \begin{pmatrix} M_p \\ -b_q \end{pmatrix}; \quad (3)$$

$$a\begin{pmatrix} 0 \\ a_q \end{pmatrix}; b\begin{pmatrix} M_p \\ -b_q \end{pmatrix}; W = \frac{1}{\lambda}a - b;$$

$$a = \begin{pmatrix} 0 \\ -s_{qq}^{-1}(I_q - A_q^t \chi_s^{-1} A_q s_{qq}^{-1})R_q \end{pmatrix};$$

$$b = \begin{pmatrix} -I_p \\ s_{qq}^{-1}(s_{pq}^t + A_q^t \chi_s^{-1}(A_p - A_q s_{qq}^{-1} s_{pq}^t)) \end{pmatrix} M_p - \begin{pmatrix} 0_p \\ s_{qq}^{-1} A_q^t \chi_s^{-1} B \end{pmatrix};$$

$$W^t \Sigma W = \left(\frac{1}{\lambda}a - b\right)^t \Sigma \left(\frac{1}{\lambda}a - b\right) = \frac{1}{\lambda^2}a^t\Sigma a - 2a^t\Sigma b\frac{1}{\lambda} + b^t\Sigma b$$

$$W^t \Sigma W - \sigma^2 = 0$$

$$\frac{1}{\lambda^2}a^t\Sigma a - 2a^t\Sigma b\frac{1}{\lambda} + b^t\Sigma b - \sigma^2 = 0;$$

If $\sigma^2 \geq \frac{(a^t\Sigma a)(b^t\Sigma b) - (a^t\Sigma b)^2}{a^t\Sigma a}$, $$\frac{1}{\lambda^{\pm}} = \frac{a^t\Sigma b}{a^t\Sigma a} \pm \sqrt{\frac{1}{a^t\Sigma a}\left(\sigma^2 - \frac{(a^t\Sigma a)(b^t\Sigma b) - (a^t\Sigma b)^2}{a^t\Sigma a}\right)}$$

$$W^{\pm} =$$

$$\frac{1}{\lambda^{\pm}}a - b = \left(\frac{a^t\Sigma b}{a^t\Sigma a}a - b\right) \pm \sqrt{\frac{1}{a^t\Sigma a}\left(\sigma^2 - \frac{(a^t\Sigma a)(b^t\Sigma b) - (a^t\Sigma b)^2}{a^t\Sigma a}\right)}a$$

$$R^t(W^- - W^+) = -2\sqrt{\frac{1}{a^t\Sigma a}\left(\sigma^2 - \frac{(a^t\Sigma a)(b^t\Sigma b) - (a^t\Sigma b)^2}{a^t\Sigma a}\right)}R^t a$$

Note that $s_{qq}^{-1}(I_q - A_q^t \chi_s^{-1} A_q s_{qq}^{-1})$ is a symmetric positive semi-definite matrix.

$$R^t(W^- - W^+) = -2\sqrt{\frac{1}{a^t\Sigma a}\left(\sigma^2 - \frac{(a^t\Sigma a)(b^t\Sigma b) - (a^t\Sigma b)^2}{a^t\Sigma a}\right)}R^t a$$

Hence $$= 2\sqrt{\frac{1}{a^t\Sigma a}\left(\sigma^2 - \frac{(a^t\Sigma a)(b^t\Sigma b) - (a^t\Sigma b)^2}{a^t\Sigma a}\right)}(R_q)^t(s_{qq}^{-1}(I_q - A_q^t\chi_s^{-1}A_q s_{qq}^{-1}))R_q \geq 0$$

Therefore, $$W = W^- = \left(\frac{a^t\Sigma b}{a^t\Sigma a} - \sqrt{\frac{1}{a^t\Sigma a}\left(\sigma^2 - \frac{(a^t\Sigma a)(b^t\Sigma b) - (a^t\Sigma b)^2}{a^t\Sigma a}\right)}\right)a - b$$

The sufficient second order condition for a maximum translates as $$\frac{1}{\lambda} \leq 0,$$

i.e.:

$(b^t\Sigma b - \sigma^2)$ or $a^t\Sigma b \leq 0$

Once we have the general formula for candidate local optimum here, the treatment to obtain the global maximum mirrors Case 1. This case can be extended in a variety of ways in financial applications.

Immediate Extensions
a) Maximizing Functions of Expectations and Variance

The local maxima in the derivation of Case II are all of the form $W(\epsilon) = U(\epsilon)\sqrt{\sigma^2 - c(\epsilon)} + V(\epsilon)$. This observation may facilitate the computation of global optima on a wider scope, for instance optimizing targets that are both functions of expected returns and variance; the target may thus be reduced to a simple function of a variance number over the range of values of $\epsilon$. More formally this observation can be formulated as:

Let's consider a function f defined on $x_+$ so that:
  for any given $x \in$, $f(x,y)$ is a decreasing function of y
  for any given $y \in_+$, $f(x,y)$ is an increasing function of x
  There exists $U, V \in^m c \epsilon_+$, such that Maximizing $f({}^tW_t R_t, {}^tW_t \Sigma_t W_t)$
subject to $$\begin{cases} AW = B \\ \underline{M} \leq W \leq \overline{M} \end{cases}$$

is simplified by taking $W(\epsilon) = U(\epsilon)\sqrt{\sigma(\epsilon)^2 - c(\epsilon)} + V(\epsilon)$ and $\sigma(\epsilon)^2$ a solution to the single variable optimization problem:
Maximize $f(R^t U(\epsilon)\sqrt{\sigma(\epsilon)^2 - c} + R^t V(\epsilon), \sigma(\epsilon)^2)$, for $\sigma(\epsilon)^2 \geq c(\epsilon)$.

Examples of such functions f in finance include Sharpe Ratio functions or Kelly criterion functions. Notice that any choice $\sigma(\epsilon)$ must be such that $W(\epsilon)(\sigma(\epsilon))$ maximize the target over all the other $W(\epsilon')(\sigma(\epsilon))$ $\epsilon'$ in E. Here the order relationship described in FIG. 1 that helps eliminate potential local extrema for speed gains is no longer applicable. One may rather seek to analytically study relationships between the $W(\epsilon)(\sigma(\epsilon))$ or $\sigma(\epsilon)$ to make deductions yielding computational gains.

Note that a similar treatment can also be made using the expression of local minima in case 1.

b) Optimization of Returns within VAR (Value at Risk) Boundaries or Tail Conditional VAR Constraints for Elliptic Distributions The result of Case II can also be straightforwardly used to maximize portfolio returns within VAR boundaries via the Chebyschev lemma correspondence between a portfolio VAR and its variance.

Recently, there has been growing interest among insurance and investment experts to focus on the use of a tail conditional expectation because it shares properties that are considered desirable and applicable in a variety of situations. In particular, it satisfies requirements of a "coherent" risk measure in the spirit developed by Artzner, et al[ii]. The existence of explicit formulas for computing tail conditional expectations for elliptical distributions[iii]—a family of symmetric distributions which includes the more familiar normal and student-t distributions—as functions of expectations and variance means Case II can be used to maximize returns on targets that put boundaries on Tail-Conditional VAR.

c) Optimization on Returns Targets with Transaction Costs

One can also in Case II include transaction costs by giving differentiated value of expected returns for positive (long) and negative (short) asset allocations. In this case, through the introduction of unit step functions, results marginally change, analytical derivations simply result in one having to associate differentiated returns to the local optima vector W, with positive values coordinates being multiplied by the long expected return and negative value coordinates being multiplied by the short expected return.

In financial applications, the method of Case II and its extensions, by their exact derivations can be more reliably used to establish Optimal VAR funds, Optimal Sharpe ratio funds, Optimal Kelly criterion funds and the like. Tail conditional VAR funds may also be used as well as obviously similar strategies.

Local Extrema Reduction Computation Methods

An easy to overlook yet simple computational reduction method is exploiting invariance by group transformations, for example Group of permutations of indices. This idea can be made more explicit with the following result:

If a subset $I_s$ of the set of indices $I_m = \{1, \ldots, m\}$ is such that the problem statement is invariant by operations of the group of permutations of $S_s$ of $I_s$, then the dimension of the problem may be reduced by making the variables indexed in $I_s$ identical.

Example: Find satisfying $x_1, \ldots, x_m$ satisfying $$\text{Max} \sum_1^m x_i^2$$

with $|x_i| \leq 1$

Here it is easy to see that $I_s = I_m = \{1, \ldots, m\}$. The problem reduces to Find x satisfying Max m $x^2$ with $|x| \leq 1$ whose solution is obviously $x = \pm 1$ leading us back to the solution of to the problem as $x_1, \ldots, x_m$ is in $\{\pm 1\}^m$ and the maximum value reached is m.

While the present invention has been described in connection with preferred embodiments, it is not intended to limit the scope of the invention to the particular form set forth, but, on the contrary, it is intended to cover such alternatives, modifications, equivalents as may be included within the spirit and scope of the invention defined in the appended claims.

Appendix 1: The Operator LinSol

This operator is used in the resolution of the linear equation when $\Sigma$ may not be an invertible matrix. Hence if $\Sigma X = B$; $X = LinSol(\Sigma, B) + Ker(\Sigma)$; The function LinearSolve in Mathematica 6.0 returns a solution of $\Sigma X = B$ even when $Ker(\Sigma) = \{0\}$ so that LinSol may simply take that solution and add $Ker(\Sigma)$ to it.

Properties of LinSol $- LinSol(\Sigma, \alpha B + \beta B') = \alpha LinSol(\Sigma, B) + \beta LinSol(\Sigma, B')$;

If $\Sigma X_0 = \alpha B + \beta B'$, $X_0 = LinSol(\Sigma, \alpha B + \beta B')$ If $\Sigma X_{0,1} = B$; $X_{0,1} = LinSol(\Sigma, B)$;

If $\Sigma X_{0,2} = B'$; $X_{0,2} = LinSol(\Sigma, B')$;

$\Sigma(\alpha X_{0,1} + \beta X_{0,2}) = \alpha B + \beta B'$ means $X_0 = \alpha X_{0,1} + \beta X_{0,2}$ $- LinSol(\alpha\Sigma, B) = \frac{1}{\alpha} LinSol(\Sigma, B)$ If $\alpha\Sigma X_0 = B$, $X_0 = LinSol(\alpha\Sigma, B)$;

$\Sigma(\alpha X_0) = B$, i.e.: $\alpha X_0 = LinSol(\Sigma, B)$

[i]"Numerical Optimization Second Edition" Nocedal & Wright Springer Series in Operations Research, 2006

[ii]"Coherent Measures of Risk," Mathematical Finance, 9: 203-228 Artzner, P., Delbaen, F., Eber, J. M., and Heath, D.

[iii]"Tail Conditional Expectations for Elliptical Distributions", Landsman, Z., Valdez, A. E., University of Haifa Technical Report N 02-04, 2002.

APPENDIX 2

(*Portfolio Risk Minimization with constraints on the variance and on both sides of proportions*)

```
(*copyright 2008 Phil Kongtcheu,All rights reserved;*)
Clear[Sig, Sig, R, σ, Onem, Wc, Wc0];
Sig = {{0.00022433435108527324, 0.00014394886649762045,
       0.00022514588847394454, 0.00010021000625408, 0.00014097563165037515},
      {0.00014394886649762045, 0.00015400539037060062, 0.00014265099501746512,
       0.00006621477020039582, 0.00010796790816927302},
      {0.00022514588847394454, 0.00014265099501746512, 0.00036382522519886667,
       0.00009860266849531493, 0.00013909279673538121},
      {0.00010021000625408, 0.00006621477020039582, 0.00009860266849531493,
       0.00016282098507368263, 0.00008430875019934272},
      {0.00014097563165037515, 0.00010796790816927302, 0.00013909279673538121,
       0.00008430875019934272, 0.00025440989770995551}};
R = {{0.001707819241706326}, {0.00014524440929878433456}, {-0.0008888039976398021},
     {0.001571110192807092}, {0.002792841482083083}};
σ = Sqrt[0.0002]; m = Length[R]; Onem = Table[{1}, {m}];
Clear[C0]; C0 = Table[{0.00}, {i, m}];
(*Solving the Optimization Problem using Mathematica's built-
   in Algorithm- to be used as a benchmark against the proposed novel method*)
Wc = ToExpression[Table[{"w"<>ToString[i]}, {i, m}]];
Wc0 = ToExpression[Table["w"<>ToString[i], {i, m}]];
Clear[InSig0]; InSig0 = Inverse[Sig];
Timing[NMinimize[{(Transpose[Wc].Sig.Wc) [[1]][[1]], (Transpose[Onem].Wc) [[1]][[1]] == 1,
       Norm[Wc, Infinity] ≤ 1, Table[If[i == 1, 1, R[[j]][[1]]], {i, 2}, {j, m}].Wc ==
       {{1}, {0.006739289957201789'}}}, Wc0]]
  NMinimize::incst : NMinimize was unable to generate any initial points satisfying the inequality constraints
       {-1 + Max[Abs[w1], Abs[w2], Abs[<<1>>], Abs[-1.07193-0.294711w1-0.719134w2-0.331844w4], Abs[w4]] ≤
           0}. The initial region specified may not contain any feasible points. Changing
           the initial region or specifying explicit initial points may provide a better solution. >>
Out[82]= {5.047, {0.000517121, {w1 → 1., w2 → -0.947372, w3 → -0.999591, w4 → 0.946955, w5 → 1.}}}
In[89]:= (*Symmetric Positive definite Matrix inversion algorithms*)
       (*Inverse through Cholesky *)
       Clear[InvCh]
       InvCh[S_] := Module[{Ui}, Ui = Inverse[CholeskyDecomposition[S]]; Ui.Transpose[Ui]];
       (*Algorithm for inverting SDP matrices*)
       Clear[InvS];
```

APPENDIX 2-continued (*Portfolio Risk Minimization with constraints on the
variance and on both sides of proportions*)

```
InvS[S_] := Module[{ns, u, InS, Si, Sis, Sit, Xc, B, Bp, Bi, k, i},
    ns = Length[S]; InS = Table[0, {i, ns}, {j, ns}]; Sis = S; Sit = Transpose[Sis];
    (*Initiating Case*)
    Si = S; B = Table[If[k = 1, 1, 0], {k, ns}];
    If[! (Sit == Si), Si = 0.5 (Sis + Sit)];
    If[Quiet[Check[Xc = LinearSolve[Si, B], { }]] = { }, InS = { }; Goto[End1]];
    (*Filling InS*)
    For[k = 1, k ≤ ns, k++, u = InS[[k]]; u[[1]] = Xc[[k]]; InS[[k]] = u;
        u = InS[[1]]; u[[k]] = Xc[[k]]; InS[[1]] = u]
    (*Loop*)
    For[i = 2, i ≤ ns, i++, Bp = Table[If[k = i, 1, 0], {k, ns}];
        B = Bp − Sum[InS[[j]][[i]]*Table[Sis[[k]][[j]], {k, ns}], {j, i − 1}];
        Bi = Table[B[[k]], {k, i, ns}];
        Si = Table[Sis[[k]][[l]], {k, i, ns}, {l, i, ns}];
        If[Quiet[Check[Xc = LinearSolve[Si, Bi], { }]] == { }, InS = { }; Goto[End2]];
        (*Filling InS*)
        For[k = i, k ≤ ns, k++, u = InS[[k]]; u[[i]] = Xc[[k − i + 1]];
            InS[[k]] = u; u = InS[[i]]; u[[k]] = Xc[[k − i + 1]]; InS[[i]] = u}
    ]; Label[End1]; Label[End2]; InS]
Clear[InvSp];
InvSp[InSigp_, eqc_, er_Integer, q_Integer] := Module[{Ss, Ss0, d, Sb, sp, x, t},
    (*Begin computing the inverse matrix of Sigp from the inverse of the parent matrix*)
    (*!!! This Algorithm is computationally very
        important. It helps transform the matrix inversion process into an O
        (q^2) instead of an O(q^3) as provided by existing algorithms!!!*)
    Ss = InSigp; x = Union[eqc, {er}]; t = 1; While[x[[t]] ≠ er, t++];
    Ss0 = Table[Ss[[If[i < t, i, i + 1]]]][[If[j < t, j, j + 1]]], {i, q}, {j, q}];
    d = Ss[[t]][[t]];
    Sb = Table[{Ss[[If[i < t, i, i + 1]]][[t]]}, {i, q}];
    sp = Ss0 − Sb.Transpose[Sb] /d; (*Sb.Transpose[Sb]/d can
        also be given directly as a Table, so choose whichever is faster*)
    (*End computing the inverse matrix of Sigp from the inverse of the parent matrix*)
    sp]
In[64]:= (*This case is abit more general as it includes the general quadratic minimization problem
    with an added linear term C'W to address various special cases, i.e. Min ½W'ΣW+C'W*)
    (*Here we implement the first Candidate extrema which gives the
    Global Minimum solution when there are no constraints activated *)
Clear[W0sg];
W0sg[m_Integer, Sig_, InSig_, A_, B_, C_, Mi_, Ms_] :=
    Module[{W, Wc, Wc0, Wx0, w0, w1, sp, σm, λp, Xmd, Udpm, Xdpm, k, s0, End1, End2, End3},
        If[Quiet[Check[LinearSolve[A, B], { }]] == { }, w0 = −1; w1 = 1; Goto[End1],
        sp = InSig; Udpm = A.sp; Xdpm = Udpm.Transpose[A];
        Xmd = InvS[Xdpm]; If[Xmd == { }, w0 = −1; w1 = 1; Goto[End1]];
        (*This is to correct rounding errors that may preclude the symetry of Xmd*);
        λp = −Xmd. (B + Udpm.C); W = −sp. (Transpose[A].λp + C);
        s0 = 0; k = 1;
        While[And[s0 == 0, k ≤ m], If[Abs[W[[k]][[1]] − (Ms[[k]][[1]] + Mi[[k]][[1]]) /2] >
            (Ms[[k]][[1]] − Mi[[k]][[1]]) /2, s0++]; k++];
        If[s0 == 0, w0 = 1; σm = (0.5*Transpose[W].Sig.W + Transpose[C].W)[[1]][[1]];
            w1 = {W, σm}; Goto[End1], w0 = 0; w1 = sp; Goto[End1]]
    ]; Label[End1]; {w0, w1}];
In{66}= (*Computing the Constrained Vectors Case:r_p condition not verified leads to w0[[1]]=0*)
    Clear[Wpsg]; Wpsg[m_Integer, p_Integer, e_, Sig_, InSigp_, A_, B_, C_, Mi_, Ms_] :=
    Module[{End1, Wx, Wc, Wx0, ep, epc, eqc, n, q, e0, n0, n1, w0, t, sp, λp,
        Udpm, Xdpm, σm, Ag, Ap, Cq, Cp, fdp, tfdp, Vdpm, s0, sigbq, sigmpq, pos, Mp,
        spq, spqt, db, Wc0, i, j, k, Sigq, Sigp, Xmd, r, x, er, ep1, Sol}, q = m − p;
        ep = e[[1]]; ep1 = e[[1]]; er = e[[2]]; n = Length[ep] ; db = Length[B]; (*e[[3]]=
            Length[ep; Correct the structure of the set E and its operations to reflect this]*);
        (*Checking first the trivial case where all constraints are active, p=m; q=0*)
        If[q == 0, For[j = 1, j <= n, Mp = Table[If[ep[[j]][[k]] < 0, Mi[[k]], Ms[[k]]], {k, m}];
            If[A.Mp == B, w0[ep[[j]]] = {1, {Mp, 0.5*Transpose[Mp].Sig.Mp+Transpose[C].Mp}},
                w0[ep[[j]]] = {−1, 1}} ; j++],
        (* If not all constraints are active, this follows... *)
        e0 = ep; n0 = n; epc = Sort[Abs[ep[[1]]]]; eqc = Complement[Table[k, {k, m}], epc];
        Ap = Table[A[[i]][[epc[[j]]]], {i, db}, {j, p}];
        Aq = Table[A[[i]][[eqc[[j]]]], {i, db}, {j, q}];
        Cq = Table[C[[eqc[[j]]]], {j, q}]; Cp = Table[C[[epc[[i]]]], {i, p}];
        (*Begin first loop*)
        (*This step may be eliminated when the existence of W verifiant the linear equality
            constraint is trivial, but this is generally not visibly the case, unless d=1*)
        For[j = 1, j ≤ n, (*Defining Mp*)
            Mp = Table[If[ep[[j]][[l]] < 0, Mi[[epc[[l]]]], Ms[[epc[[l]]]]], {l, p}];
            (*Begin checking that the linear equality constraint ApMp+AqWq=B is verified*)
            If[Quiet[Check[LinearSolve[Aq, B − Ap.Mp], { }]] == { }, w0[ep[[j]]] = {−1, 1};
                e0 = Complement[e0, {ep[[j]]}]; n0−−;]; j++];
```

APPENDIX 2-continued (*Portfolio Risk Minimization with constraints on the
variance and on both sides of proportions*)

```
        (*End checking that the linear equality constraint ApMp+AqWq=B is verified*)
        (*End first loop*)
        ep = e0; n1 = n0; If[n1 ≧ 1,
          sp = InvSp[InSigp, eqc, er, q];
            (*Begin computing intermediary parameters to compute the candidate optimum*)
          spq = Table[Sig[[epc[[i]]]][[eqc[[j]]]], {i, p}, {j, q}]; spqt = Transpose[spq];
          Sigq = Table[Sig[[eqc[[i]]]][[eqc[[j]]]], {i, q}, {j, q}];
          Sigp = Table[Sig[[epc[[i]]]][[epc[[j]]]], {i, p}, {j, p}];
          Udpm = Aq.sp; Xdpm = Udpm.Transpose[Aq]; Xmd = InvS[Xdpm];
          If[Xmd == { }, w0[ep[[j]]] = {-1, 1}; Goto[End1]];
          fdp = Ap - Udpm.spqt; tfdp = Transpose[fdp];
          Mp = Table[{0}, {i, p}]; For[j = 1, j ≦ n1, (*Defining Mp*)
            Mp = Table[If[ep[[j]][[k]] < 0, Mi[[epc[[k]]]], Ms[[epc[[k]]]]], {k, p}];
          λp = Xmd.(fdp.Mp - (B + Udpm.Cq));
          Wx0 = -sp.(spqt.Mp + Transpose[Aq].λp + Cq);
          For[i = 1, i ≦ q, pos[eqc[[i]]] = i; i++]; For[i = 1, i ≦ p, pos[epc[[i]]] = i; i++];
          Wx = Table[If[MemberQ[eqc, k], Wx0[[pos[k]]], Mp[[pos[k]]] ], {k, m}];
          r = (spq.sp.spqt - Sigp).Mp + (spq.sp.Cq - Cp) - tfdp.λp;
          (*Begin Algorithm for checking r_p*)
          s0 = 0; k = 1;
          While[And[k ≦ p, s0 == 0], If[! Or[ And[Mp[[k]] == Mi[[epc[[k]]]], r[[k]][[1]] ≧ 0],
              And[Mp[[k]] == Ms[[epc[[k]]]], r[[k]][[1]] <= 0]], s0++] ; k++];
          (*End Algorithm for checking r_p*)
          (*Begin Algorithm for checking that Abs[Wx-(Ms+Mi)/2]≦(Ms-Mi)/2<→s0=0*)
          k =1; While[And[k ≦ q, s0 == 0],
            If[ Abs[Wx0[[k]][[1]] - (Ms[[eqc[[k]]]][[1]] + Mi[[eqc[[k]]]][[1]]) / 2] >
              (Ms[[eqc[[k]]]][[1]] - Mi[[eqc[[k]]]][[1]]) / 2, s0++] ; k++];
          (*End Algorithm for checking that Abs[W-(Ms+Mi)/2]≦(Ms-Mi)/2 & r_p<→s0=0*)
          If[s0 == 0, w0[ep[[j]]] = {1, {Wx, 0.5 * Transpose[Wx].Sig.Wx + Transpose[C].Wx}},
            w0[ep[[j]]] = {0, sp}]; Label[End1];
          j++];
        ];];
        Sol = Table[w0[ep1[[j]]], {j, n}]; Sol];
In[67]= (*Intermediate functions to facilitate the
    handling of alternative cases in the global algorithm*)
  (*The inclusion function checks if e1 is included in e0*)
  (*This function also assumes e0 and e1 are represented as e0,e1={i_1^s,...,i_p^s};*)
  Clear[Inc]; Inc[e0_, e1_] := If[e0∩e1 == e0, 1, 0];
  (*This function is used to add elements to Eps when Abs[w0]=1*)
  Clear[Addp]; Addp[e_, Ep_] := Union[{e}, Ep];
  (*This function checks if ep is a descendent of an element in Esp*)
  (*This function assumes ep represented as ep=
    {i_1^s,...,i_k^s,...,i_p^s} is and Esp is represented as Esp=
      {{{i_1^1,...,i_{n01}^{n01}}},...,{{i_1^1,...,i_m^1},...,{i_1^1,...,i_m^{n0m}}}}*)
  Clear[DesI]; DesI[ep_, Esp_] := Module[{d, i, j, p, n0}, d = 0; i = 1;
    p = Length[ep]; While[And[d == 0, i < p], n0 = Length[Esp[[i]]]; j = 1;
      If[n0 > 0, While[And[d == 0, j ≦ n0], d = Inc[Esp[[i]][[j]], ep]; j++]]; i++]; d];
  (*Subs is used to remove from a list of equivalent elements of Es,
    those that descend from elements in Eps *)
  (*This function assumes e is represented as e=
    {{{i_1^1,...,i_k^1,...,i_p^1},...,{i_1^{n0},...,i_k^{n0},...,i_p^{n0}}},i_k};
  Indeed the n0 elements of e[[1]] are equivalent;
  Ep is represented as Ep={{{i_1^1,...,i_{n01}^{n01}}},...,{{i_1^1,...,i_m^1},...,{i_1^1,...,i_m^{n0m}}}}*)
  Clear[Subs]; Subs[e_, Ep_] :=
    Module[{p, n0, e0}, p = Length[e[[1]]][[1]]]; If[p ≦ 1, e, e0 = e; n0 = Length[e[[1]]] ;
      If[n0 > 0, For[i = 1, i ≦ n0, If[DesI[e[[1]][[i]], Ep] == 1,
        e0[[1]] = Complement[e0[[1]], {e[[1]][[i]]}] ] ; i++]]; e0] ];
  (*Check the issue of "Return" within "Module", especially for the computation of Wp*)
  (*Make sure the structure of e, e',E,Ep, is harmonized throughout and
    how p may be a parameter that does not have to be computed each time*)
  (*Sorts is meant to prevent that rearranged indices get duplicated in e[[1]]
    simply because their listing order is different.To see its importance,
    remove the Sorts funtion in the Add funtion below, i.e. es=Sorts[e];
    becomes es=e and try this example for both
      cases:AddD[{1,2},{{{{1,2,3},{1,2,-3}},3,{{{-1,2,4},{-1,2,-4}},4}},4,2] *)
  Clear[Sorts]; Sorts[e_] := Module[{es, es1, est, p}, es = e; es1 = es[[1]];
    p = Length[es1]; est = { }; For[i = 1, i ≦ p, es1[[i]] = Sort[es1[[i]]];
    est = Union[est, {es1[[i]]}]; i++]; es[[1]] = est; es];
  (*Add is used to add elements to Es when Abs[w0]=0*)
  (*This function assumes e is represented as e=
    {{{i_1^1,...,i_k^1,...,i_p^1},...,{i_1^{n0},...,i_k^{n0},...,i_p^{n0}}},i_k};
  Indeed the n0 elements of e[[1]] are equivalent; Ep is represented as Ep=
    {e0,...,en0} where e is the representative form of the elements ek of Ep*)
```

APPENDIX 2-continued (*Portfolio Risk Minimization with constraints on the
variance and on both sides of proportions*)

```
    Clear[Add]; Add[e_, Ep_] :=
      Module[{n0, j, ej, Eps, es}, es = Sorts[e]; Eps = Ep; n0 = Length[Eps] ;
        If[n0 > 0,
          j = 1; ej = Eps[[1]]; While[And[j ≦ n0, Sort[Abs[es[[1]][[1]]]] ≠ Sort[Abs[ej[[1]][[1]]]]],
            If[j + 1 ≦ n0, ej = Eps[[j + 1]]]; j++]; If[j ≦ n0, ej[[1]] = Union[ej[[1]], es[[1]]];
            ej[[2]] = es[[2]]; Eps[[j]] = ej; Eps, Union[{es}, Ep] ] ,
            {e} ]
      ];
  (* This function assumes e is represented as e={$i_1^s,...,i_p^s$};
    Ep is represented as Ep={e0,...,en0} where e is the representative form of the elements ek=
      {{{$i_1^1,...,i_k,...,i_p^1$},....,{$i_1^{n0},...,i_k,...,i_p^{n0}$}},$i_k$} of Ep *)
    Clear[AddD]; AddD[e_, Ep_, dim_, p_] := Module[{de, q, Ad, desck},
      de = Complement[Table[i, {i, dim}], Abs[e]]; q = dim − p; Ad = Ep;
      If[q ≧ 1, For[k = 1, k ≦ q, desck = {{Union[e, {de[[k]]}], Union[e, {−de[[k]]}]}, de[[k]]};
        Ad = Add[desck, Ad]; k++] ]; Ad ];
In[74]= (*MAIN ALGORITHM*)
    Clear[QuadOptEg]
    QuadOptEg[m_Integer, Sig_, InSig_, A_, B_, C_, Mi_, Ms_] :=
      Module[ {Wm, sp, Wo, e, e10, n0, n, Em, Ep, i, j, p,
          σm, σ0, InSigp, Inve, A0, B0, Mi0, Ms0, End1, End2, x0, y0, z0, dn},
        Wm = { }; σm = +∞; σ0 = +∞;
        sp = InSig; x0 = { }; Inve[x0] = sp; (*Inve is an internally defined function
          that stores inverse matrices of submatrices of Sig previously computed*)
        dn = 1; Wo = W0sg[m, Sig, sp, A, B, C, Mi, Ms];
        If[Abs[Wo[[1]]] == 1,
            If[Wo[[1]] == 1,
              Wm = {Wo[[2]][[1]]}; σm = Wo[[2]][[2]]; Goto[End1],
              Wm = { }; σm = Null; Goto[End2]] ,
          Em = Table[{ }, {i, m}]; Ep = Table[{ }, {i, m}];
          For[k = 1, k ≦ m, Em[[1]] = Em[[1]]∪{{{−k}, {k}} , k}}; k++];
          p = 1; While[ p ≦ m, n0 = Length[Em[[p]]];
              i = 1; While[ i ≦ n0, e = Subs[Em[[p]][[i]], Ep]; n = Length[e[[1]]];
                If[n > 0, dn++;
                  x0 = Complement[Abs[e[[1]][[1]]], {e[[2]]}];
                  InSigp = Inve[x0]; Wo = Wpsg[m, p, e, Sig, InSigp, A, B, C, Mi, Ms];
                  For[j = 1, j ≦ n,
                    If[Abs[Wo[[j]][[1]]] == 1, y0 = Addp[e[[1]][[j]], Ep[[p]]]; Ep[[p]] = y0;
                      If[Wo[[j]][[1]] == 1, σ0 = Wo[[j]][[2]][[2]][[1]][[1]];
                        If[σm > σ0, σm = σ0; Wm = {Wo[[j]][[2]][[1]]},
                          If[σm == σ0, Wm = Union[Wm, {Wo[[j]][[2]][[1]]}]] ]
                      ], e10 = e[[1]][[j]]; Inve[Sort[Abs[e10]]] = Wo[[j]][[2]];
                      If[p + 1 ≦ m, z0 = AddD[e10, Em[[p + 1]], m, p]; Em[[p + 1]] = z0]
                    ]; j++]];
                i++];
              p++]
          ];
          Label[End1]; Label[End2]; {dn, Wm, σm}];
  (* END MAIN ALGORITHM *)
  In[76]= Timing[QuadOptEg[m, Sig, InSig0, Table[If[i == 1, 1, R[[j]][[1]]], {i, 2}, {j, m}],
          {{1}, {0.006739289957201789'}}, C0, −Onem, Onem]]
  Out[76]= {0.64, {31, {{{0.951336}, {−0.951336}, {−1}, {1}, {1}}}, 0.00026333}}
```

The invention claimed is:

1. In industrial applications, a method for deriving the one or more global extrema of an optimization problem that can be reduced to an objective function of n variables to be minimized or maximized subject to a finite number m of functional equality or inequality constraints on the variables, where n and m are non-negative integers, said method comprising the steps of:

receiving, via a first input device linked to a computer processor, a description of the objective function, the m inequality and equality constraint functions and the n variables;

establishing, by a computer processor, a check-list set E indexing potential Karush Kuhn Tucker (KKT) local extrema points and the order in which they are computed by ranking them in groups E(p) from the ones having the least number p of active inequality constraints to the ones having the most number of active inequality constraints, resulting in parent or ancestor-descendant relationships where a parent or ancestor active constraints are always part of the active constraints set of a descendant;

establishing, by the computer processor, an exclusion or pruning check-list set Ep indexing the potential KKT local extrema points, which along with descendants must be excluded from further consideration as candidate global extremum point; and transmitting, by an output device linked to the computer processor, the one or more optimal solutions yielded upon exhausting the comparison of the KKT local extrema points indexed by E not included in Ep;

wherein said method further comprises any one or more of the steps of:

deriving, by the computer processor, the KKT equations and inequalities from the input descriptions as well as the second order optimality conditions;

computing, by the computer processor, each candidate local extremum point indexed in the list E that is not excluded in Ep, where each such computation further yields information as to whether the candidate local extremum is admissible, whether their indexing parameter should be added to Ep and within which scope, and when further descendants might still need to be computed, yield intermediary parameters to facilitate such computation;

comparing by the computer processor, the extremum value associated with an admissible local extremum point with that of any previously computed or assigned and if found to be an improvement, storing it so that the one or more extrema points stored in the computer memory are always associated with the optimal value among all admissible extrema computed up to that point;

yielding, upon exhausting all values indexed in E not excluded by Ep, the stored one or more extrema points with the associated optimal value.

2. The method of claim 1, further comprising any one or more of the following steps:

a) solving, by the computer processor, the KKT equations by:

establishing a system of block-coordinate decomposition to facilitate incremental consideration of additional constraints; where for each candidate local extremum, the number p of inequality constraints that have reached their boundary identifies one of the two blocks; and simplifying the KKT equations via a step of assigning to the slacking parameters corresponding to the $q=m-p$ inequality constraints not reached, the value zero;

b) yielding, by the computer processor, the local extrema point W and the p-dimensional vector of KKT slacking parameters $\gamma_p$ corresponding to coordinates that are supposed to have reached the equalities boundaries;

c) transmitting, via an output device linked to the computer processor, W and $\gamma_p$.

3. The method of claim 1, wherein any computed candidate local extrema W is excluded from a list of acceptable local extrema if any one of the following conditions are not verified:

all the inequality constraints involving the candidate extremum point W and all of the sign constraints involving the slacking parameters vector $\gamma_p$ are verified;

the symmetric positive semi-definite condition for a minimum or symmetric negative semi-definite condition for a maximum on the second order derivative or the Hessian at the candidate local extrema point is verified.

4. The method of claim 1, further including a step of reducing the computational cost where a candidate local extremum and its descendants are added to Ep to exclude them from future evaluation if any one of the following conditions are verified:

a. equality constraints and the selected inequality reached at the boundary for the given extremum result in an empty set;

b. descendants are not logically deduced to be verifying second order derivative conditions;

c. admissible local extrema points are logically deduced to yield an extremum value that is more optimal than any value associated with its descendants.

5. The method of claim 1 further includes a step of reducing the computational cost using various strategies including any one or more of:

a. grouping together, by the computer processor, descendants whose associated extrema are computed using the same intermediate parameters;

b. finding by the computer processor symmetries among the variables, including permutations invariance or other similar transformations, that help reduce number of actual variables n or m or the cost of computing intermediate parameters;

c. computing, by the computer processor, intermediary parameters for the expression of a candidate local extremum point from parameters yielded by the computation of a parent candidate local extremum point.

6. The method of claim 1, where the objective function of n variables to be minimized or maximized and the functional equality or inequality constraints on the variables are linear or quadratic, or contain unit step discontinuities.

7. The method of claim 1, further comprising facilitating parametric sensitivity analysis by enabling a computer processor to accurately compute variations in the exact expression of the extrema with respect to variations in desired parameters.

8. The method of claim 6, further comprising facilitating the resolution of an optimization problem that is a function of expectation and variance, said method further comprising any one or more of the steps of:

i) inputting an expectation objective function that is linear in the variables for a fixed variance that is a quadratic function of the variables with optional additional linear inequality or equality constraints and obtaining the local or global extrema functional expression;

ii) using the analytic expression of the local or global extrema to find the fixed variance which optimizes the function of expectation and variance;

iii) replacing said optimal variance for the fixed variance input.

9. The method of claim 8, further comprising embedded in financial markets, in a method for establishing an optimal Value at Risk (VAR) fund or an optimal Sharpe Ratio fund or an optimal Kelly criterion fund, said method further comprising receiving via an input device linked to a computer processor, instructions to do any one or more of the following:

identify the assets in which the fund can invest in and a method to derive their expected returns and covariance matrix and specify if any, boundaries on allocation in the assets;

choose a VAR strategy and specify the maximum value at risk number given a specified confidence level, or choose a Sharpe Ratio strategy or Kelly criterion strategy;

for a VAR strategy, instructions to transform the maximum value at Risk number into a variance number via distributional information or the Chebyshev inequality;

compute, by the computer processor, the solution of the resulting quadratic or quadratically constrained optimization problem to obtain the optimal asset allocations.

* * * * *